United States Patent [19]
Wright

[11] Patent Number: 5,374,483
[45] Date of Patent: Dec. 20, 1994

[54] RADIATION CURABLE ACRYLOXYFUNCTIONAL SILICONE COATING COMPOSITION

[75] Inventor: Antony P. Wright, Midland County, Mich.

[73] Assignee: Dow Corning Corporation, Midland, Mich.

[21] Appl. No.: 20,036

[22] Filed: Feb. 22, 1993

Related U.S. Application Data

[60] Division of Ser. No. 839,007, Feb. 14, 1992, Pat. No. 5,260,350, which is a continuation of Ser. No. 379,836, Jul. 14, 1989, abandoned.

[51] Int. Cl.$^5$ .................................................. B32B 27/36
[52] U.S. Cl. .................................... 428/412; 428/447; 428/480; 428/500; 522/79; 522/83; 522/84; 522/99
[58] Field of Search ............... 428/447, 412, 480, 500; 522/99, 83, 84, 79

[56] References Cited

U.S. PATENT DOCUMENTS

| | | | |
|---|---|---|---|
| 4,455,205 | 6/1984 | Olson | 524/291 |
| 4,486,504 | 12/1984 | Chung | 522/99 |
| 4,603,086 | 7/1986 | Fujii | 522/99 |
| 4,697,026 | 9/1987 | Lee et al. | 522/99 |

FOREIGN PATENT DOCUMENTS 0424645  5/1991  European Pat. Off. .

*Primary Examiner*—Susan Berman
*Attorney, Agent, or Firm*—Arnie R. Jarnholm

[57] ABSTRACT

The present invention relates to a silicone coating composition which, when cured on a solid substrate either by ultraviolet or electron beam radiation, provides a transparent abrasion resistant coating firmly adhered thereon. The silicon coating is prepared by reacting at least one multifunctional acrylate monomer with an amino-organofunctional silane, mixing the modified silane with at least one acrylic monomer and thereafter adding colloidal silica.

12 Claims, No Drawings

RADIATION CURABLE ACRYLOXYFUNCTIONAL SILICONE COATING COMPOSITION

This is a divisional application of copending application(s) Ser. No. 07/839,007 filed on Feb. 14, 1992, now U.S. Pat. No. 5,260,350, which is a continuation of patent application Ser. No. 07/379,836 filed on Jul. 14, 1989 and now abandoned.

BACKGROUND OF THE INVENTION

This invention delays with a siloxane composition used primarily as a transparent coating on solid substrates. More specifically the composition can be used to coat solid substrates to render such substrates abrasion resistant, weather resistant, ultraviolet light. (UV), resistant, and to allow such substrates to be tinted and/or dyed. The compositions of this invention when cured on solid substrates especially polycarbonate, yield uniform, gel free, glossy surfaces to the coated substrates. Current markets for such coatings are well established and will expand as the abrasion resistance and weatherability of these coatings is improved.

The present invention offers significant advantages over many of the known silicone coating compositions in that an amino-organofunctional silane is used instead of the more costly acryloxyfunctional silanes to solubilize and stabilize the colloidal silica. Silicone coating compositions found in the relevant background information such as U.S. Pat. No. 4,455,205 issued Jun. 19, 1984 and assigned to General Electric Company, Schenectady, N.Y., discloses an ultraviolet light curable, composition prepared from the addition of a multifunctional acrylate monomer to a mixture of an acryloxyfunctional silane and aqueous colloidal silica. The solvent remaining after mixing the components is removed with heating; a photo initiator is then added and the composition is UV radiation cured. Similarly, U.S. Pat. No. 4,486,504 issued Dec. 4, 1984 and assigned to General Electric Company, Waterford, N.Y., discloses an ultraviolet light curable composition prepared from the addition of a multifunctioal acrylate monomer to a mixture of acryloxyfunctional silanes, and/or glycidoxy functional silanes and aqueous colloidal silica. The solvent remaining after mixing the components is removed with heating; a photo initiator is then added and the composition is UV radiation cured. Thus, neither of these patents teach the composition or the process of the present invention.

Amino-organofunctional silanes and siloxanes have been incorporated into coating compositions that are used as adhesion promoters and releasing films but never before has colloidal silica been added to these formulations to provide a silicon coating composition which, when cured on a solid substrate provides a transparent abrasion resistant coating firmly adhered thereon. U.S. Pat. No. 4,603,086 and assigned to Dai Nippon Insatsu Kabushiki Kaisha: Shin-Etsa Kagaku Kogyo Kabushiki Kaisha, both of Japan, discloses silicone compounds made by reacting a primary amino-organofunctional silane with a di-or multifunctional acrylic compound b a Michael addition reaction. Similarly, U.S. Pat. No. 4,697,026 and assigned to Dow Corning Corporation, Midland, Mich., discloses silicone compounds made by reacting a primary or secondary amino-organofunctional silane with a di-or multifunctional acryl compound by a Michael addition reaction. The uniqueness of the present invention is found in that it further reacts the products formed from the reaction between an amino-organofunctional silane and multifunctional acrylate with dispersions of colloidal silica to yield a transparent abrasion resistant coating with superior properties.

SUMMARY OF THE INVENTION

To take advantage of more cost effective materials and improved properties, a new curable coating composition has been discovered which, when cured on a solid substrate renders such substrates abrasion resistant, weather resistant, ultraviolet light resistant, and allows such substrates to be tinted and/or dyed. The present invention relates to a composition produced by the mixing of colloidal silica with the reaction product of an amino-organofunctional silane an a multifunctional acrylate. The solvent remaining after mixing the components may optionally be removed. In addition, this composition, unlike those of the prior art, may be cured by either ultraviolet light or electron beam radiation.

The composition comprises:
(A) at least one multifunctional acrylate monomer;
(B) an amino-organofunctional silane modified multifunctional acrylate monomer and.
(C) colloidal silica; where (B) comprises the reaction product of
  (i) at leas tone multifunctional acrylate monomer of (A) and,
  (ii) an amino-organofunctional silane of the general formula:

wherein:
X is selected from alkoxy groups having 1-6 carbon atoms;
Q and Q' are the same or different divalent hydrocarbon groups;
Z is a hydrogen or a monovalent hydrocarbon group;
a is an integer from 1 to 3; and
h is an integer from 0 to 6.

This invention also relates to a process for coating solid substrates with the above described compositions which process comprises preparing a solid substrate to receive the inventive composition, contacting the substrate with the inventive composition and thereafter curing the inventive composition on the substrate by either ultraviolet or electron beam radiation.

A third aspect of this invention is a solid substrate coated with a cured composition of this invention.

DETAILED DESCRIPTION OF THE INVENTION

Component (A) of this novel composition comprises at least one acrylate monomer which contains two or more functional groups selected from the group consisting of acryloxy and methacryloxy groups. These multifunctional acrylate monomers may be used singly or in combination with other multifunctional acrylate monomers. Some preferred multifunctional acrylate monomers useable as component (A) include: diacrylates of the formulas;
1,6-hexanediol diacrylate,
1,4-butanediol diacrylate,
ethylene glycol diacrylate,
diethylene glycol diacrylate,
tetraethylene glycol diacrylate,
tripropylene glycol diacrylate, neopentyl glycol diacrylate,
1,4-butanediol dimethacrylate,
poly(butanediol)diacrylate,
tetraethylene glycol dimethacrylate,
1,3-butylene glycol diacrylate,
triethylene glycol diacrylate,
triisopropylene glycol diacrylate,
polyethylene glycol diacrylate,
bisphenol A dimethacrylate.
triacrylates of the formulas:
trimethylolpropane triacrylate,
trimethylolpropane trimethacrylate,
pentaerythritol monohydroxy triacrylate,
trimethylolpropane triethoxy triacrylate.
tetraacrylates of the formulas:
pentaerythritol tetraacrylate,
di-trimethylolpropane tetraacrylate.
pentaacrylates of the formulas:
dipentaerythritol (monohydroxy) pentaacrylate.

These multifunctional acrylate monomers are commercially available from Aldrich Chemical Company, Inc., Milwaukee, Wis.

The second component of this composition (B) comprises the reaction product of
(i) at least one multifunctional acrylate monomer of (A) and,
(ii) an amino-organofunctional silane of the general formula:

$$X_aSi\{Q(NHQ')_bNZH\}_{4-a}$$

wherein:
X is selected from alkoxy groups having 1–6 carbon atoms;
Q and Q' are the same or different divalent hydrocarbon groups;
Z is a hydrogen or a monovalent hydrocarbon group;
a is an integer from 1 to 3; and
b is an integer from 0 to 6.

Preferred for this invention are monoamines and diamines, that is amines wherein b is 0 or 1. Specific examples of the most preferred amino-organofunctional silanes are:
n-(2-aminoethyl-3-aminopropyl)trimethoxysilane
3-aminopropyltriethoxysilane
3-aminopropyltrimethoxysilane
anilinopropyltrimethoxysilane.

These amino-oganofunctional silanes are commercially available from Petrarch Systems, Inc., Bristol, Pa.

The amino-organofunctional silane modified multifunctional acrylate compounds of this invention can be prepared by intimately mixing an amino-organofunctional silane compound having at least one primary amine or secondary amine group with an acrylate functional compound as described in component (A). When an amine compound and an acrylate compound are mixed, there is a reaction which produces an acrylate functional compound. This reaction is generally known as the Michael addition reaction. For example in the reaction between (i) and (ii), a primary or secondary amine functionality of the amino-organofunctional silane undergoes a Michael addition to one or more of the acrylate double bonds of the multifunctional acrylate monomers described in component (A). The resulting product is referred to as an amino-organofunctional silane modified multifunctional acrylate monomer. This reaction occurs at a temperature of form room temperature to 100° C. Heating the mixture increases the rate of the reaction, however, as the temperature of the reaction is increased, the loss of acrylate functionality due to free radical initiated chain reactions also increases. At temperatures above 100° C. considerable loss of the acrylate functionality may occur.

Using a polar solvent also increases the reaction rate of the Michael addition reaction. Alcohols are the preferred solvents because of their low boiling points, non hazardous properties and alcohols can easily be removed from the compositions, if desired. Suitable alcohols, for example, include any water soluble or water miscible alcohol, for example, methanol, ethanol, propanol, butanol, etc., or ether alcohols, such as ethoxyethanol, butoxyethanol, methoxypropanol, etc., For purposes of the present process, applicant prefers to use isopropanol as a solvent because of its low cost and nonhazardous properties. In addition, to ensure sufficient time for the Michael addition to take place, applicant prefers that the time and temperature the reactants remain in contact to between six and seventy two hours at room temperature.

The third component (C) of this composition comprises silica in the form of a colloidal dispersion. Colloidal silica is a dispersion of submicron-sized silica (SiO₂) particles in an aqueous or other solvent medium. The colloidal silicas used in this composition are dispersions of submicron size silica (SiO₂) particles in an aqueous or organic solvent or combination thereof. Colloidal silica is available in acid or basic form. Either form may be utilized. An example of satisfactory colloidal silica for use in these coating compositions is Nalco 1034A colloidal silica (Nalco 1034A), Nalco 84SS258 colloidal silica (Nalco 84SS258) and Nalco 1129 colloidal silica (Nalco 1129) which can be obtained from Nalco Chemical Company, Naperville, Ill.

Nalco 1034A has a mean particle size of 20 nm and an SiO₂ content of approximately 34% by weight in water with a pH of approximately 3.1. Nalco 84SS258 has a mean particle size of 20 nm and an SiO₂ content of approximately 30% by weight in a solution of propoxyethanol. Nalco 1129 has a mean particle size of 20 nm and an SiO₂ content of approximately 30% by weight in a solution of 40% 2-Propanol (IPA) and 30% water.

It is believed by the inventors herein, that with the addition of colloidal silica, the amino-organofunctional silane modified multifunctional acrylate monomer, undergoes methoxy-hydroxy silane condensation with the colloidal silica. In other words, the methoxy groups on the modified amino-organofunctional silane are replaced by hydroxy groups which are able to hydrogen bond to the hydroxy groups present on the surface of the roughly spherical colloidal silica particles. As a result, it is believed that the silica particles are encapsulated by the amino-organofunctional silane modified multifunctional acrylate monomers and remain suspended because of the attractive forces between the hydroxy groups on the amino-organofunctional silane modified multifunctional acrylate monomers. While not wishing to be bound by any particular mechanism or theory, applicant believes that the encapsulated silica particles are suspended in the mixture because of the van der Waals forces between the acrylate monomers.

Other additives can be added to the compositions in order to enhance the usefulness of the coatings. For example, leveling agents, ultraviolet light absorbers, dyes and the like, can be included herein. All of these additives and the use thereof are well known in the art and do not require extensive discussions. Therefore, only a limited number will be referred to, it being understood that any of these compounds can be used so long as they do not deleteriously affect the radiation curing of the coating composition and do not adversely affect the non-opaque character of the coating.

A particularly desirable additive has been found to be a small amount of a leveling agent. Leveling agents can be used on the substrates to cover surface irregularities and aid in the uniform dispersion of the coating composition. These agent are especially useful in compositions where all the solvent has been removed. For purposes of the present invention, the addition of 0.01 to 5.0 percent commercial silicone glycol leveling agents, work well to provide the coating composition with desirable flowout and wetting properties.

Also useful as additives to the present coating compositions are UV absorbers. UV absorbers act to diminish the harmful effects of UV radiation on the final cured composition and thereby enhance the wetherability, or resistance to cracking, yellowing and delamination of the coating. Incorporating UV absorbers into the instant compositions will permit the curing process regardless of whether UV or electron beam radiation is used to cure the composition. However, in the situation where UV radiation is to be used to cure the composition, the amount of UV absorbers added must be carefully controlled so as not to hinder the cure. This limitation does not exist in the case of electron beam radiation cure.

For the purpose of the present compositions the following UV absorbers and combinations thereof in concentrations of less than 20 weight percent based on the total composition, have been shown to produce desirable results: bis(1,2,2,6,6-pentamethyl-4-piperidinyl)(3,5-bis(1,1-dimethylethyl 1-4-hydroxyphenyl)methyl)butylpropanedioate, 2-ethylhexyl-2-cyano -3,3'-diphenylacrylate, 2-hydroxyl-4-n-octoxybenzophenone, 2-(2'-hydroxy-5'-methylphenyl)benzotriazole and poly(oxy-1,2-ethanediyl), alpha-(3-(3-(2H-benzotriazol-2-yl)-5-(1,1-dimethylethyl) -4-hydroxylphenyl)-1-oxopropyl)-omega-hydroxy. Concentrations of UV absorbers, however, in the range of 1 to 5 percent based on the total weight of the composition are preferred.

In the practice of the present invention, the radiation curable compositions can be made by combining the multifunctional acrylate monomer, or mixtures thereof with a given quantity of alcohol. Generally, the manner in which these components are mixed together is not important. The amino-organofunctional silane is added dropwise to the mixture while agitation is applied. The mixture is then stirred at a certain temperature for a sufficient period of time to allow the Michael Addition to take place. At this time, a small amount of acid may, optionally, be added dropwise to the mixture. Suitable acids include, for example, weak acids such as acetic acid and acrylic acid, etc., and, for example, dilute solutions of strong acids such as hydrochloric acid and nitric acid, etc.. The colloidal silica is then added quickly while vigorous agitation is applied to the mixture. After allowing the mixture to stand for a period of time, the volatiles may optionally be removed by vacuum stripping and/or the mixture may optionally be filtered.

According to the coating process of the present invention, the above described composition is coated on a substrate using conventional coating techniques modified as appropriate to the particular substrate. For example, this composition can be applied to a variety of solid substrates by methods such as flow coating, dip coating, spin coating, spray coating or curtain coating. These various methods of coating allow the composition to be placed on the substrate at variable thicknesss thus allowing a wider rang of use of the composition. Coating thicknesses may vary, but for improved abrasion resistance coating thicknesses of 3–25 microns, preferably about 5 microns, are recommended.

The compositions are then cured by either ultraviolet or electron beam radiation. The compositions may be ultraviolet light cured if one or more photoinitiators is added prior to curing. There are no special restrictions on the photoinitiators as long as they can generate radicals by the absorption of optical energy. Ultraviolet light sensitive photoinitiators or blends of initiators used in the UV cure of the present composition include 2-Hydroxy-2-methyl-1-phenyl-propan-1-one (Darocur 1173), sold by EM Chemicals, Hawthrone, N.Y., and 2,2-Dimethoxy-2-phenyl-acetyl-phenone (Urgacure 651), sold by Ciba-Geigy Corporation, Howthorne, New York. For purposes of this invention, it has been found that from 0.05 to 5 weight percent based on the total solids in the composition, of the photoinitiators described herein will cause the composition to cure. Desirable hard, transparent coatings having excellent adhesion can thus be obtained when the composition of this invention is applied to a substrate and exposed to radiation such as that provided by UV lamps.

When the aforementioned photoinitiators are used, these additives are individually mixed with the aforementioned amino-organofunctional silane modified multifunctional acrylate monomers and a dispersion of the multifunctional acrylate monomers and colloidal silica.

Alternaively, the coating composition may be electron beam radiation cured. Low energy electron beam radiation has the advantage over UV cure of decreasing the curing time while increasing the cross link density of the coated sample. Because electron beam radiation has a shorter wavelength than UV radiation, EB radiation penetrates deeper into a coating sample causing more of the functional groups to react thus resulting in a greater degree of cross linking in the sample. In addition, nonfunctional groups may also react in the presence of EB radiation therefore further increasing the cross link density of the coating sample. EB cure also allows for an increase in weatherablility of the coating because a greater concentration of UV absorbers may be added to EB cured compositions than to compositions which are UV cured since the need for photoinitiators is eliminated. UV absorbers function to protect the substrate and the coating from the deleterious effects of ultra-violet light thus resulting in the greater weatherability of EB radiation cured coated substrates.

Electron beam accelerators of various types such as van de Graaff-type, resonance transformer-type, linear-type, dynatron-type, and high frequency-type can be used as a source of electron beam. Electron beam having energy of from 50 to 1000 KeV, preferably from 100 to 300 KeV discharged therefrom may be irradiated in a dose of from 0.1 to 10 Mega Rads (MR). Particularly preferred source of electron beam is one wherein continuous curtain-like beam is irradiated from linear filaments. Examples of commercially available sources of electron beam are Electro Curtain CB-150 available from Energy Sciences Inc., and NP-ESH 150 available from Otto Durr.

The curable composition obtained in the process of the present invention is coated on the surface of a substrate (e.g., polycarbonate, etc.). After said composition has been ultraviolet light or electron beam treated, a cured coating film is formed.

By choice of the proper formulation and application conditions including the optional use of a leveling agent, the compositions can be applied and will adhere to substantially all solid substrates. Substrates which are especially contemplated herein are transparent and non-transparent plastics and metals. More particularly, these plastics are synthetic organic polymeric substrates such as acrylic polymers like poly(methylmethacrylate); polyesters, such as poly(ethlene terephthalate), poly(butylene terephthalate), etc.; polyamides; polyimides; acrylonitrile-styrene copolymers; styrene-acrylonitrile-butadiene copolymers; polyvinyl chloride; butyrates; polyethylene; polyolefins and the like including modifications thereof. The compositions of this invention are especially useful as transparetn coatings for polycarbonates such As poly(bisphenol-A carbonate) and those polycarbonates known as Lexan (R), sold by General Electric Company, Schenectady, N.Y.; and as coatings for acrylics such as polymethylmethacrylates. Metal substrates on which the present compositions are also effective include bright and dull metals like aluminum and bright metallized surfaces like sputtered chromium alloy. Other solid substrates contemplated herein include wood, painted surfaces, leather, glass, ceramics and textiles.

The apparatus and testing procedures used for the results shown herein are as follows:

Adhesion Test

Adhesion was measured by cross-hatch adhesion. A series of cross-hatch scribes are made in an area of one square inch with lines to form 1/10 inch squares. This surface is covered with 1.0 inch No. 600 Scotch Brand adhesive tape which is pressed down firmly over the cross-hatched area. The tape is withdrawn from the surface of the substrate with one rapid motion at about a 90° angle. This action of applying and removing the tape is carried out three times and then the substrate is observed. The number of squares remaining intact on the substrate are reported as a percentage of the total number of squares on the grid.

Steel Wool Test

A two inch square of 0000 steel wool was applied over the face of a 24 oz. hammer and was secured with a rubber band. Coated sample blanks were tested for scratch resistance to 20 double rubs across the center of the sample with the weighted steel wool. The hammer s held by the end of its handle such that the majority of the pressure on the steel wool comes from the hammer head. The sample is graded according to the amount of scratching produced by the steel wool and hammer. The absence of scratches on the sample is graded a 1; slight scratching is graded a 2 and heavy scratching is graded a 3.

Abrasion Test (Tabor Test)

Abrasion resistance was determined according to ASTM Method D-1044. The instrument used wa s aTeledyne moded 503 Taber Abraser with two 250 gram auxiliary weights (500 gram load) for each of the CS10F abrasive wheels. The acrylic and polycarbonate test panels were subjected to 100 and 500 cycles on the abraser turntable. The percent change in haze which is the criterion for determining the abrasion resistance of the coating is determined by measuring the difference in haze of the unabrased and abrased coatings. Haze is defined as the percentage of transmitted light which, in passing through the sample, deviates from the incident beam by forward scattering. In this method, only light flux that deviates more than 2.5 degrees on the average is considered to be haze. The percent haze on the coatings was determined by ASTM Method D1003. A Gardner Haze Meter was used. The haze was calculated by measuring the amount of diffused light, dividing by the amount of transmitted light and multiplying by one hundred.

Pencil Test

This test is meant to be a qualitative method of determining scratch resistance of a coating. A coated panel is placed on a firm horizontal surface. A pencil is held firmly against the film at a 45° angle (point away from the operator) and pushed away from the operator in a ¼-in. (6.5-mm) stroke. The process is started with the hardest lead pencil and continued down the scale of hardness tot he pencil that will not cut into or gouge the film. The hardest pencil that will not cut through the film to the substrate for a distance of at least ⅛ in. (3 mm) is reported according to the following scale from Berol Corporation, Brentwood, Tenn.:

- - - softer - - - - - - harder - - - 6B, 5B, 4B, 3B, 2B, B, HB, F, H, 2H, 3H, 4H, 5H, 6H, 7H, 8H, 9H, the HB grade is approximately equal to that of a #2 pencil. The F grade is slightly harder and is the one most commonly used. The H grades are harder than that and get progressively harder up through the 9H grade which is very hard. The B grade is softer than the HB grade and get progressively softer through the 6B grade which is very soft.

Tinting Test

Coated samples were tinted using commercially available dyes from Brain Power, Inc., Miami, Fla., U.S.A. The coated samples were tinted using BPI Black #4600. The tinting was carried out using an Ecomomy Six Model dye system from BPI. The tinting was carried out at about 93° C. by immersing the coated sample in BPI Lens Preparation for one (1) minute at 90° C. and then into the dye bath for up to 45 minutes. In the tables of the examples the time of immersion is indicated at 5 minutes (5 min.), 15 minutes (15 min.), 25 minutes (25 min.), 35 minutes (35 min.) and 45 minutes (45 min.). The light transmission through the sample was measured using a Gardner Haze Meter, model XL-835 Colorimeter, and is reported as % transmission.

In order that those skilled in the art may better understand how to practice the present invention, the following examples are given by way of illustration and not by way of limitation.

EXAMPLE 1

A mixture of 0.2 g of aminopropyltrimethoxysilane, 10.0 g of t-butanol. 1.32 g of hexanedioldiacrylate and 1.32 g of trimethoylpropanetriacrylate was stirred at room temperature for 18 hours. To this mixture was added 0.62 g of glacial acetic acid. The mixture was then allowed to stand for five minutes. Next 3.2 g of Nalco 1034A was added while the mixture underwent vigorous agitation. The mixture was then allowed to stand for five minutes, before being vacuum stripped at 50° C. under 5 Torr pressure for ten minutes.

The resulting mixture was applied to a 4×4 acrylic panel using a #8 wire wound rod and to a 4×4 polycarbonate panel by the method of spin coating. Next, each panel was electron beam cured under 4MR 106 KeV electron dose at a belt speed of 68 feet per minute under a six inch wide electron beam operated with a 4 milliamp electron current in a nitrogen atmosphere containing 200 ppm oxygen.

The compositional ratios and test results are summarized in Table I.

EXAMPLE 2

A mixture of 4.38 g of aminopropyltrimethoxysilane, 168.3 g of t-butanol, 22.23 gms of hexanedioldiacrylate and 22.23 g of trimethoylpropanetriacrylate was stirred at room temperature for 72 hours. To 5.0 g of this mixture, 3.75 g of Nalco 84SS258 was added while the mixture underwent vigorous agitation. The mixture was then allowed to stand for five minutes, before being vacuum stripped at 30° C. under 5 Torr pressure to reduce the volatile content to 54%.

The resulting mixture was then filtered through a 5 micron filter and applied to a 4×4 acrylic panel using a #8 wire wound rod. The treated panel was then exposed to a flow of air for approximately twenty minutes to remove the remaining solvent. Next, the panel was electron beam cured under 4 MR 160 KeV electron dose at a belt speed of 68 feet per minute under a six inch wide electron beam operated with a 4 milliamp electron current in a nitrogen atmosphere containing 200 ppm oxygen.

The compositional ratios and test results are summarized in Table I.

EXAMPLE 3

A mixture of 1.01 g of aminopropyltrimethoxysilane, 38.75 g of isopropanol, 5.12 g of hexanedioldiacrylate and 5.12 g of trimethoylpropanetriacrylate was stirred at room temperature for 72 hours. To this mixture was added 0.46 g of glacial acetic acid. The mixture was then allowed to stand for five minutes. Next, 16.58 g of Nalco 1034A was added while the mixture underwent vigorous agitation. The mixture was then allowed to stand for five minutes, before being vacuum stripped at 35 C and 2 mm Hg, until all volatiles were removed. The resulting mixture was spin coated onto a 4×4 polycarbonate panel and electron beam cured under 4MR, 160 KeV electron dose at a belt speed of 68 feet per minute under a six inch wide electron beam operated with a 4 milliamp electron current in a nitrogen atmosphere containing 200 ppm oxygen.

The compositional ratios and test results are summarized in Table I and Table II.

EXAMPLE 4

A mixture of 1.01 g of aminopropyltrimethoxysilane, 38.75 g of IPA, 5.12 g of hexanedioldiacrylate and 5.12 g of trimethoylpropanetriacrylate was stirred at room temperature for 72 hours. To this mixture was added 0.46 g of glacial acetic acid. The mixture was then allowed to stand for five minutes. Next, 16.58 g of Nalco 1034A were added while the mixture underwent vigorous agitation. The mixture was then allowed to stand for five minutes before being vacuum stripped at 35 C and 2 mm Hg, until all volatiles were removed. To 2.0 g of the resulting mixture, 0.01 g of Dow Corning (R) 57 leveling agent was added. The mixture was then spin coated onto a 4×4 polycarbonate panel and electron beam cured under 4MR, 160 KeV electron dose at a belt speed of 68 feet per minute under a six inch wide electron beam operated with a 4 milliamp electron current in a nitrogen atmosphere containing 200 ppm oxygen.

The compositional ratios and test results are summarized in Table I and Table II

EXAMPLE 5

A mixture of 1.08 g of aminopropyltrimethoxysilane, 51.46 g of IPA, 1.36 g of hexanedioldiacrylate and 3.79 g of trimethoylpropanetriacrylate was stirred at room temperature for 72 hours. To this mixture was added 0.23 g of glacial acetic acid. The mixture was then allowed to stand for five minutes. Next, 11.24 g of Nalco 1034A was added while the mixture underwent vigorous agitation. The resulting mixture was then filtered through a 5 micron filter.

The filtered mixture was flow coated onto a 4×4 polycarbonate panel, which was allowed to air dry for 5 minutes. The coated composition was then electron beam cured under 4MR, 160 KeV electron dose at a belt speed of 68 feet per minute under a six inch wide electron beam operated with a 4 milliamp electron current in a nitrogen atmosphere containing 200 ppm oxygen.

The compositional ratios and test results are summarized in Table I.

EXAMPLE 6

A mixture of 1.08 g of aminopropyltrimethoxysilane, 25.36 g of IPA, 1.36 g of hexanedioldiacrylate and 3.79 g of trimethoylpropanetriacrylate was stirred at room temperature for 72 hours. To this mixture was added 0.23 g of glacial acetic acid. The mixture was then allowed to stand for five minutes. Next, 12.73 g of Nalco 1129 was added while the mixture underwent vigorous agitation. The resulting mixture was then filtered through a 5 micron filter.

The filtered mixture was flow coated onto a 4×4 polycarbonate panel, which was allowed to air dry for 5 minutes. The coated composition was then electron beam cured under 4MR, 160 KeV electron dose at a belt speed of 68 feet per minute under a six inch wide electron beam operated with a 4 milliamp electron current in a nitrogen atmosphere containing 200 ppm oxygen.

The compositional ratios and test results are summarized in Table I.

The compositional ratios and test results are summarized in Table I.

EXAMPLE 7

A mixture of 1.08 g of aminopropyltrimethoxysilane, 51.46 g of IPA, 1.36 g of hexanedioldiacrylate and 3.79 g of trimethoylpropanetriacrylate was stirred at room temperature for 72 hours. To this mixture was added 0.23 g of glacial acetic acid. The mixture was then allowed to stand for five minutes. Next, 11.24 g of Nalco 1034A was added while the mixture underwent vigorous agitation. The mixture was then allowed to stand for five minutes before 0.50 g of DAROCUR 1173, sold by EM Chemicals, Hawthorne, N.Y., and 0.10 g of methldiethanolamine were added. The resulting mixture was filtered through a 5 micron filter.

The filtered mixture was flow coated onto a 4×4 polycarbonate panel, which was allowed to air dry for 5 minutes. The coated polycarbonate sample was then UV cured by passing the sample through a medium pressure mercury vapor arc lamp with an average intensity of 91.56 mW/cm² at a line speed of three feet per minute. The compositional ratios and test results are summarized in Table I.

EXAMPLE 8

A mixture of 1.53 g of anilinopropyltrimethoxysilane, 51.47 g of IPA, 1.36 g of hexanedioldiacrylate and 0.40 g of bisphenol A dimethacrylate was stirred at room temperature for 72 hours. To this mixture was added 0.23 g of glacial acetic acid. The mixture was then allowed to stand for five minutes. Next, 11.24 g of Nalco 1034A was added while the mixture underwent vigorous agitation. The mixture was then flow coated onto a 4×4 polycarbonate panel, which was allowed to air dry for 5 minutes. The coated composition was then electron beam cured under 4MR, 160 KeV electron dose at a belt speed of 68 feet per minute under a six inch wide electron beam operated with a 4 milliamp electron current in a nitrogen atmosphere containing 200 ppm oxygen.

The compositional ratios and test results are summarized in Table I.

EXAMPLE 9

A mixture of 1.53 g of anilinopropyltrimethoxysilane, 51.47 g of IPA, 1.36 g of hexanedioldiacrylate and 3.34 g of trimethoylpropanetriacrylate was stirred at room temperature for 72 hours. To this mixture was added 0.23 g of glacial acetic acid. The mixture was then allowed to stand for five minutes. Next, 11.24 g of Nalco 1034A was added while the mixture underwent vigorous agitation. The mixture was then flow coated onto a 4×4 polycarbonate panel, which was allowed to air dry for 5 minutes. The coated composition was then electron beam cured under 4MR, 160 KeV electron dose at a belt speed of 68 feet per minute under a six inch wide electron beam operated with a 4 milliamp electron current in a nitrogen atmosphere containing 200 ppm oxygen.

The compositional ratios and test results are summarized in Table I.

gardless of whether electron beam or ultraviolet light radiation is used to cure these compositions.

TABLE II

| COMPO-SITION | % LIGHT TRANSMISSION v. DYE BATH TIME | | | | | |
|---|---|---|---|---|---|---|
| | 0 min. | 5 min. | 15 min. | 25 min. | 35 min. | 45 min |
| Example 3 | 88.0 | 70.1 | 56.9 | 50.2 | 45.4 | 41.3 |
| Example 4 | 88.0 | 67.7 | 57.4 | 51.1 | 45.7 | 42.4 |

The results in Table II show that Example 3 and Example 4 become increasingly tinted (transmit less light) as the sample time in the dye bath is increased.

Many variations will suggest themselves to those skilled in this art in light of the above detailed description. All such obvious modifications are within the full intended scope of the appended claims.

What is claimed is:

1. A method of coating a surface on a substrate with an abrasion-resistant coating comprising the steps of:
   (1) formulating a coating composition by reacting the following components in a solution of a polar solvent:
   at least one multifunctional acrylic monomer;
   an amino-organofunctional silane of the formula $$X_aSi\{Q(NHQ')_bNZH\}_{4-a}$$

wherein
   X is selected form alkoxy groups having 1 to 6 carbon atoms;
   Q and Q' are the same or different divalent hydrocarbon groups;
   Z is hydrogen or a monovalent hydrocarbon group;
   a is an integer from 1 to 3; and
   b is an integer from 0 to 6;
   for a time and at a temperature sufficient to form a Michael adduct therefrom;
   (2) adding an acid to the above-resulting solution; and thereafter
   (3) adding colloidal silica to the above-resulting solution;

TABLE I

| COMPOSITION | SiO₂ Wt. % | ABRASION TEST | | ADHESION TEST | STEEL WOOL | PENCIL TEST | SUBSTRATE |
|---|---|---|---|---|---|---|---|
| | | % ΔH₁₀₀ | % ΔH₅₀₀ | | | | |
| Example 1 | 30.0 | 2.4 | 9.8 | 100% | 2 | — | A* |
| Example 1 | 30.0 | 1.6 | 7.6 | 100% | 2 | F | P* |
| Example 2 | 50.0 | 1.9 | 4.1 | 100% | 2 | — | A* |
| Example 3 | 33.7 | 3.4 | 15.6 | 100% | 1 | 2H | P* |
| Example 4 | 33.7 | 3.6 | 17.6 | 100% | 1 | 2H | P* |
| Example 5 | 38.0 | 2.1 | 5.1 | 100% | 1 | H | P* |
| Example 6 | 38.0 | 2.8 | 9.9 | 100% | 2 | H | P* |
| Example 7 | 38.0 | 2.7 | 9.1 | 100% | 1 | 2H | P* |
| Example 8 | 38.0 | 7.1 | 19.6 | 100% | 1 | F | P* |
| Example 9 | 38.0 | 5.2 | 13.5 | 100% | 1 | HB | P* |

A* is plexiglas G uncoated, cast polymethacrylate from Rohm and Haas Corporation, Philadelphia, PA.
P* is Lexan (R) polycarbonate from General Electric Company, Schenectady, New York.

The results in Table I show, among other things, that the percent change in haze which is the criterion for determining the abrasion resistance of a coating, is low where amino-organofunctional silanes are used in a composition containing multifunctional acrylates and colloidal silica. Example 5 highlights the fact that an abrasion resistant coating will result whether or not the solvent remaining after mixing is removed. In addition, hard abrasion resistant transparent coatings result, re- (4) applying the resulting coating composition to the surface of said substrate; and
   (5) curing the coating composition with radiation.

2. The method of claim 1 further comprising the steps of: adding one or more photo initiators to the coating composition prior to the curing step; and carrying out the curing step by exposing the coating composition to ultraviolet radiation.

3. The method of claim 1 wherein said curing step is carried out by subjecting the coating composition to electron beam radiation.

4. The method of claim 1 further comprising the step of stripping the polar solvent from said resulting composition before applying the same to the surface of said substrate.

5. An article of manufacture comprising:
(A) a substrate defining at least one surface;
(B) said at least one surface being coated with an abrasion-resistant coating formulated by:
(1) reacting the following components in a solution of a polar solvent:
at least one multifunctional acrylate monomer;
an amino-organofunctional silane of the formula $$X_a Si\{Q(NHQ')_b NZH\}_{4-a}$$

wherein:
X is selected from alkoxy groups having 1 to 6 carbon atoms;
Q and Q' are the same or different divalent hydrocarbon groups;
Z is hydrogen or a monovalent hydrocarbon group;
a is an integer from 1 to 3; and
b is an integer from 0 to 6; for a time and at a temperature sufficient to form a Michael adduct therefrom;
(2) adding an acid to the above-resulting solution; thereafter
(3) adding colloidal silica to the above-resulting solution; and
(C) said abrasion-resistant coating being radiation-cured upon said at least one surface.

6. The article of claim 5 wherein said substrate is transparent.

7. The article of claim 5 wherein said substrate is an acrylic polymer.

8. The article of claim 5 wherein said substrate is polyester.

9. The article of claim 7 wherein said polyester substrate is selected from the group consisting of: poly(ethylene terephthalate); poly(butalene terephthalate); poly(diethylene glycol bis allyl) carbonate; and poly(diphenylol propane) carbonate.

10. The article of claim 5 wherein said substrate is a polycarbonate.

11. The article of claim 5 wherein said substrate is in the form of a lens.

12. The article of claim 5 wherein said substrate is in the form of an air deflection shield.

* * * * *